UNITED STATES PATENT OFFICE.

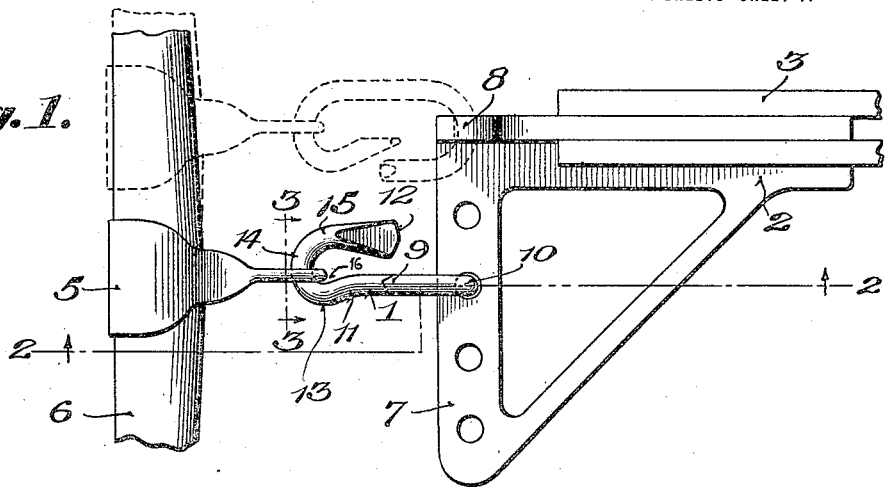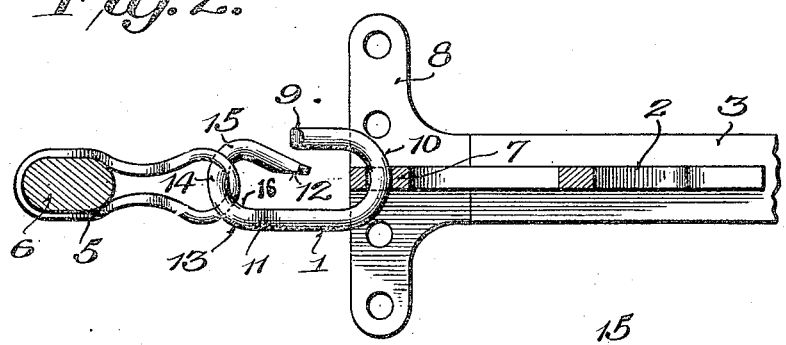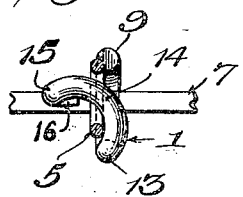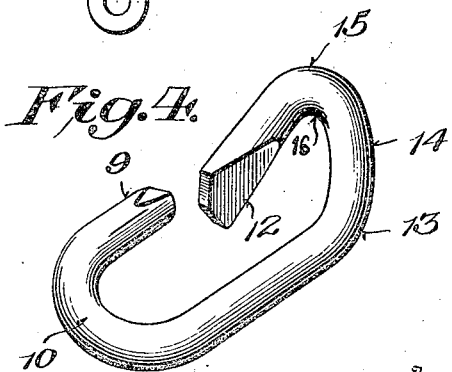

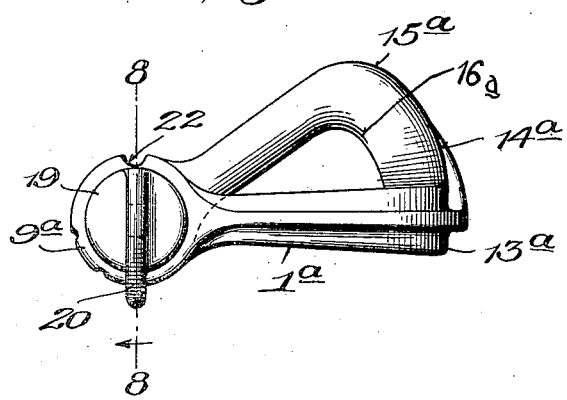
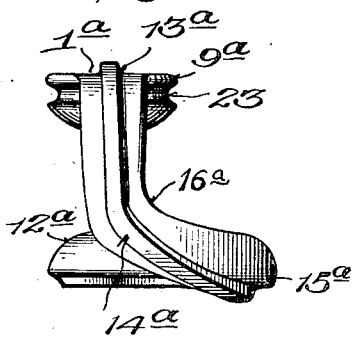
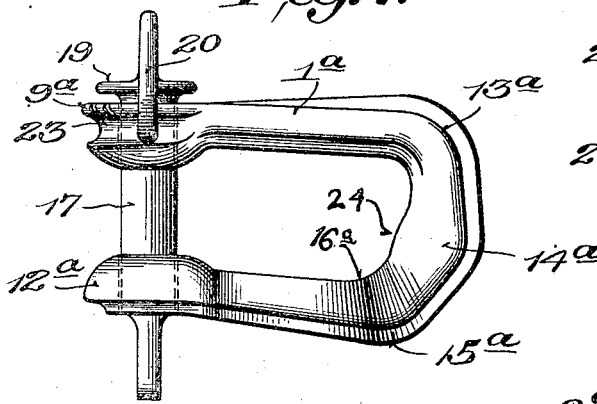
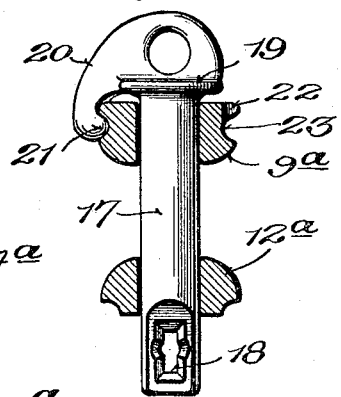
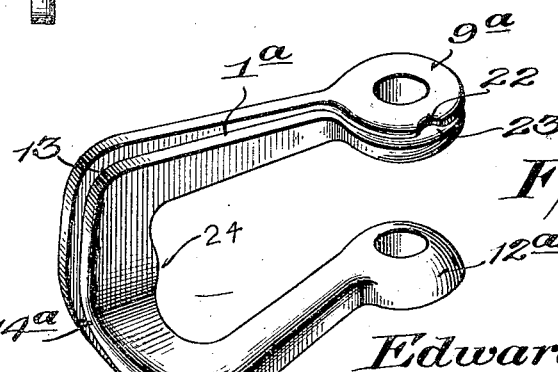

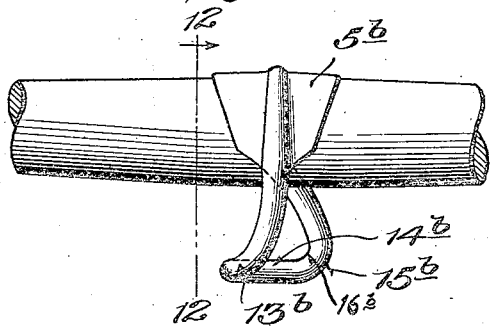
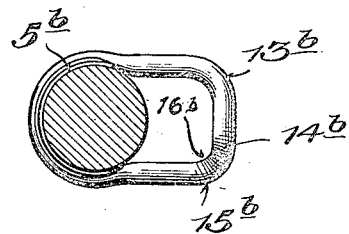
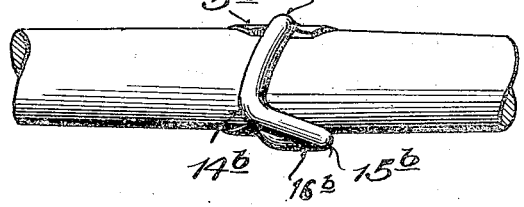
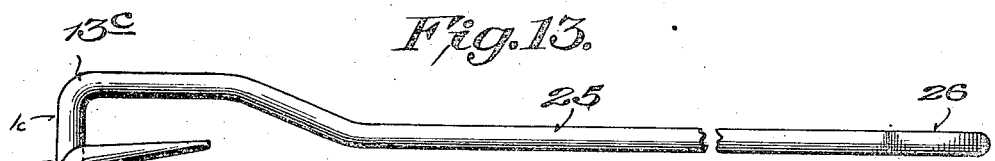
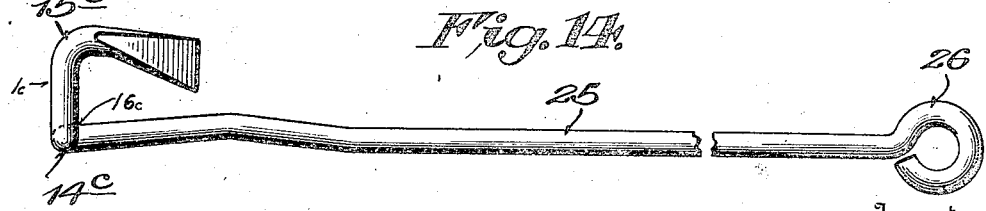

EDWARD FOWLER AND JOHN V. LEWIS, OF ST. ELMO, TENNESSEE.

DRAFT COUPLING.

1,422,194.   Specification of Letters Patent.   Patented July 11, 1922.

Application filed February 21, 1919. Serial No. 278,554.

*To all whom it may concern:*

Be it known that we, EDWARD FOWLER and JOHN V. LEWIS, both citizens of the United States, residing at St. Elmo, in the county of Hamilton and State of Tennessee, have invented certain new and useful Improvements in Draft Couplings, of which the following is a specification.

Our invention relates to draft couplings, or devices for operatively connecting a drawn element, such as an agricultural implement or the like, and a pulling element, such as a horse-drawn single or double-tree or the like.

It is well known that when a pull is exerted on a lead through a series of two or more links, hooks, loops, shackles or the like, efficiency demands that the successive links, etc., or, at least, their contact or seat portions, shall cross one another at substantially right angles. But in actual practice it may be necessary to couple together a pair of draft elements which lie in the same plane, as both horizontal, or both vertical, or, in another instance, one of the elements may lie in a horizontal plane and the other in a vertical plane. In the former case, the interposed coupling member may be flat, that is to say, with both its forward and rear seat or draft-transmitting portions lying in the same plane; but in the latter case, in order to produce efficient draft conditions, one end of the interposed member must be adapted to engage in one plane while the other end engages in a plane at right angles. Accordingly, draft links have been employed in which the forward and rear loops, hooks, eyes or the like, have been disposed at right angles, but of course, such a link would not be suitable where the elements to be connected lie in the same or parallel planes. So far as we are aware, prior to the present invention, there has never been in use a draft coupling capable of a dual or alternative use, either for coupling elements lying in the same plane, or elements, one of which lies in one plane and the other in a plane at right angles to the first. The object of our invention is to provide a draft coupling which will be capable of the alternative use referred to; that is, one which will couple and transmit a pull through a pair of draft elements regardless of the angular relation of those elements to one another and with uniform efficiency in all instances.

In the accompanying drawings, in which we have shown, by way of illustration, several embodiments of our invention, Fig. 1 is a plan view of a single-tree coupled by means of a hitching link or hook, in which our invention is embodied, to one of the vertical holes of a combination clevis of well known form. The dotted lines indicate the link engaging the horizontal branch of the clevis. The clevis is shown as secured to the forward end of a plow-beam (shown in part only);

Fig. 2 is a similar view, in which the draft link is inserted in one of the horizontal holes of the clevis;

Fig. 3 is a sectional view on the line 3—3 of Fig. 1;

Fig. 4 is a perspective view of the hitching link shown in the preceding figures;

Fig. 5 is an edge view of a coupling shackle constructed in accordance with our invention;

Fig. 6 is an end view of the same;

Fig. 7 is a plan view of the same;

Fig. 8 is a sectional view on the line 8—8 of Fig. 5;

Fig. 9 is a perspective view of the shackle shown in Figs. 5 to 8;

Figs. 10, 11 and 12 are plan, end and side elevational views, respectively, of an embodiment of our invention, showing its application directly to the connecting band of a whiffletree; and Figs. 13 and 14 are side elevational and plan views, respectively, of another embodiment of our invention;

Referring more specifically to the drawings, in Figs. 1 and 2 one form of our improved draft or hitch link 1 is shown as the coupling element between a clevis 2, mounted on the forward end of a plow-beam 3, and fastening-band 5, on single-tree 6. In Fig. 1, link 1 is shown in full lines engaging the horizontal branch of clevis 2, while it is shown in dotted lines engaging the vertical branch 8, the single-tree 6 in each instance maintaining the horizontal position. This fairly represents the utility of a draft link which is capable of coupling a vertical or a horizontal draft element with another draft element, which may be either vertically or horizontally disposed; the peculiar character of the coupling-link is more clearly shown in Figs. 3 and 4.

In the form of our invention illustrated in Figs. 1 to 4, the coupling-link 1 may be regarded as derived from an ordinary chainlink, of which substantially one-half, comprising from the end 9, through the contact or seat portion 10 to a point near 11, is unmodified. From the point 11 to the end 12 the normal curve of the link is abandoned and in its place a peculiar twist is given, which constitutes the essential feature of our invention. At or adjacent to the contact or seat 13, instead of bending inwardly toward the end 9 in the same plane, the link has a short section from 14 to 15 which lies in a plane perpendicular to the axis of draft and provides a contact or seat 16 at right angles to the seat 13. From 15 the direction changes again in such a manner that the end 12 lies substantially parallel to the end 9 with a space between the ends. As a consequence of the shape just described, the link 1 can be coupled with band 5 when the latter lies in a plane perpendicular to that of the end 9 and seat 10, in which case band 5 will lie across and at right angles to seat 13, as shown in Fig. 1; or, as shown in Figs. 2 and 3, the band 5 may lie parallel to the main plane of link 1, in which case the former will lie across seat 16, at right angles thereto.

Another embodiment of the underlying principle is illustrated in Figs. 5 to 9. In this example, the ends $9^a$ and $12^a$ of a U-loop or shackle $1^a$, are formed as eyes to receive a pin 17, by means of which the loop may be coupled to the clevis 2 of Figs. 1 and 2, or an equivalent device. The pin 17 may be retained in place either by means of a split pin, for which a perforation 18 is provided in one end of the pin, or preferably a special head is formed on the opposite end, as shown. This head 19 has a finger 20 with a projection or hook 21 at its extremity, which is adapted to pass through a notch or gate 22 and slide freely in the groove 23 formed on the eye portion $9^a$. The eye portion $12^a$ is cam-shaped, or eccentric with respect to the perforation, so that when the pin 17 is rotated counterclockwise (Fig. 5), the projection 21 will become wedged or cramped against the bottom of groove 23 and thus be held against accidental displacement. The pin 17 and the parts which co-operate therewith are the subject of an independent invention which will be covered in a separate application. The central portion of what may be called the whiffletree end of the loop $1^a$ is formed with contact sections $13^a$ and $14^a$, which are disposed at substantially right angles to one another and lie in a plane perpendicular to the axis of draft. It will be apparent that the shackle $1^a$ can be linked with an element, such as band 5, so that the latter will bear upon either portion $13^a$ or $16^a$, depending upon the angular relation of the loop and band. Between the seat or contact sections $13^a$ and $16^a$, a slight protuberance or hump 24 may be provided in order to seat the coupled elements a little more positively, but we do not regard this as an essential element of our invention.

In Figs. 10 to 12 is shown a mode of applying the principle of our invention to the band $5^b$ of a whiffletree 6. In a manner similar to that employed with respect to shackle $1^a$ in Figs. 5 to 9, the band $5^b$ is bent so as to provide two contact or seat sections $13^b$ and $16^b$, disposed at substantially right angles. It will be apparent that the band $5^b$ may be hitched or coupled with a hook or open link, no matter at what angle the hook or link may be presented.

In Figs. 13 and 14 the principle has been applied to an elongated coupling hook 25, such as is sometimes used. At one end any suitable coupling member is provided, as for example, eye 26, while the other end is formed as a hook $1^c$, so bent as to have two seats $13^c$ and $16^c$, of different angularities.

Claims:

1. A draft element having at one end an elongated bearing section lying perpendicular to the axis of draft and bent to form a plurality of seating sections arranged at angles to each other and lying in the same plane.

2. A draft element having at one end an elongated bearing section lying perpendicular to the axis of draft and bent to form a horizontal and a vertical seating section lying in the same plane, said seating sections communicating with each other whereby a coupling member engaged with said draft element may be shifted from one of said seating sections to the other without uncoupling said coupling member from said draft element.

3. A draft element having one end flattened axially to provide an elongated seating portion, said seating portion being bent to provide a plurality of seats angularly disposed to one another.

EDWARD FOWLER.
JOHN V. LEWIS.